United States Patent
Yamamoto et al.

(10) Patent No.: US 8,780,056 B2
(45) Date of Patent: Jul. 15, 2014

(54) POSITION DETECTING DEVICE INCLUDING DISPLAY FUNCTION

(75) Inventors: Sadao Yamamoto, Koshigaya (JP); Naoto Onoda, Koto-ku (JP)

(73) Assignee: Wacom Co., Ltd., Saitama (JP)

( * ) Notice: Subject to any disclaimer, the term of this patent is extended or adjusted under 35 U.S.C. 154(b) by 975 days.

(21) Appl. No.: 12/581,069

(22) Filed: Oct. 16, 2009

(65) Prior Publication Data

US 2010/0110029 A1   May 6, 2010

(30) Foreign Application Priority Data

Oct. 31, 2008   (JP) .................. 2008-282399

(51) Int. Cl.
   *G06F 3/041* (2006.01)
   *G09G 3/34* (2006.01)

(52) U.S. Cl.
   USPC .......................................... 345/173; 345/107

(58) Field of Classification Search
   None
   See application file for complete search history.

(56) References Cited

U.S. PATENT DOCUMENTS

| | | | | |
|---|---|---|---|---|
| 5,194,852 A | * | 3/1993 | More et al. ................ | 345/182 |
| 5,392,058 A | * | 2/1995 | Tagawa ..................... | 345/104 |
| 5,610,629 A | * | 3/1997 | Baur ......................... | 345/104 |
| 5,642,134 A | * | 6/1997 | Ikeda ........................ | 345/174 |
| 5,929,834 A | * | 7/1999 | Inoue et al. ................ | 345/104 |
| 6,323,989 B1 | * | 11/2001 | Jacobson et al. .......... | 359/296 |
| 2004/0150629 A1 | * | 8/2004 | Lee ........................... | 345/173 |
| 2007/0216657 A1 | * | 9/2007 | Konicek .................... | 345/173 |
| 2008/0048989 A1 | * | 2/2008 | Yoon et al. ................ | 345/173 |
| 2008/0162996 A1 | * | 7/2008 | Krah et al. ................. | 714/27 |
| 2008/0238871 A1 | * | 10/2008 | Tam .......................... | 345/158 |
| 2008/0309627 A1 | * | 12/2008 | Hotelling et al. .......... | 345/173 |

FOREIGN PATENT DOCUMENTS

| | | | |
|---|---|---|---|
| EP | 109832 A2 | * | 5/1984 |
| EP | 1818789 A2 | * | 8/2007 |
| JP | 10-20992 A | | 1/1998 |

* cited by examiner

*Primary Examiner* — Alexander S Beck
*Assistant Examiner* — Kirk Hermann
(74) *Attorney, Agent, or Firm* — Seed IP Law Group PLLC

(57) ABSTRACT

A position detecting device includes: a display unit having a first electrode formed of a transparent conductive film, a plurality of second electrodes, and display material interposed between the first electrode and the second electrodes; a display driver configured to drive the display unit based on a video signal input to the display driver; and a position detecting section configured to detect a position of an indicator on the first electrode and to output the detected position. The display unit may comprise, for example, an "electronic paper," such that the display state of the display unit can be maintained even after a drive power applied between the first electrode and the second electrodes is discontinued.

11 Claims, 12 Drawing Sheets

POSITION DETECTING DEVICE INCLUDING DISPLAY FUNCTION

CROSS REFERENCES TO RELATED APPLICATIONS

The present invention claims the benefit of the Japanese Patent Application JP 2008-282399 filed in the Japanese Patent Office on Oct. 31, 2008, the entire contents of which are incorporated herein by reference.

BACKGROUND OF THE INVENTION

1. Field of the Invention

The present invention relates to a position detecting device. More particularly, the present invention relates to a novel position detecting device to which a display function is added without reducing transmittance.

2. Description of the Related Art

There are various kinds of input devices for providing position information to a computer. Such input devices include a kind of position information input device called a "touch panel". The touch panel is an input device for operating a computer and the like by touching a flat detection surface thereof with an input tool such as a finger, a dedicated stylus pen and the like. The touch panel is configured by superimposing a position detecting device for detecting an indicated position on a display region of a liquid crystal display device. In the touch panel, the position touched by the finger or the dedicated stylus pen is detected, the detected position is indicated in the screen, and an instruction is output to the computer.

A touch panel is widely used in PDAs (Personal Digital Assistant), ATMs (Automated Teller Machines), railway ticket-vending machines and the like.

Various kinds of positional information detection technologies can be applied to a touch panel. For example, there exist a resistance film type position detecting device which detects the position based on pressure change, an electrostatic capacity type position detecting device which detects the position based on capacitance change of a film on the flat detection surface, and the like. A related art is described in Japanese Unexamined Patent Application Publication No. 10-020992.

In many cases, an electrostatic capacity type position detecting device is used to configure the aforesaid touch panel, especially when the position detecting device is used to detect the position indicated by a finger. When combining the electrostatic capacity type position detecting device with the display device, the position detecting device is superimposed on the display device.

A new type of display device, an "electronic paper," attracts much attention recently. In the electronic paper, darkness (between, for example, white and black) and/or color are controlled by applying a voltage to electrically-charged color powder. Since the electronic paper consumes less electrical power and can be made much thinner compared with the liquid crystal display device (which is widely used as the display device), electronic paper is becoming popular, particularly when used to display a still image, a text and the like.

There is a demand for adding other functions to an electronic paper. For example, it is desired that the electronic paper allows a note, a mark, or a label to be attached thereto, just like a normal paper. To obtain these functions, a possible method would be to superimpose an electrostatic capacity type position detecting device on an electronic paper in a similar manner to the aforesaid touch panel, so that the aforesaid functions can be added.

However, when a position detecting device, such as the electrostatic capacity type position detecting device, is superimposed on a display region of a display device, a plurality of transparent members will be superimposed on each other in the display region. As a result, transmittance of the display region would be reduced. Further, since a plurality of transparent members are superimposed on each other, thickness of the electronic paper would increase compared with an electronic paper having no aforesaid additional functions.

In view of the problems described above, one object of the present invention is to provide a position detecting device to which a display function is added without reducing transmittance and increasing thickness.

SUMMARY OF THE INVENTION

To solve the aforesaid problems, a position detecting device according to an aspect of the present invention includes: a display unit which has a first electrode formed of a transparent conductive film, a plurality of second electrodes, and display material interposed between the first electrode and the second electrodes; a display driver for performing display driving of the display unit based on a signal-to-be-displayed; and a position detecting section for detecting a position indicated on the first electrode by an indicator and outputting the detected signal, wherein the display state of the display unit can be maintained even after supply of a drive power applied between the first electrode and the second electrodes is discontinued.

The electronic paper and the position detecting device share the transparent conductive film, which is a common element. Sharing the transparent conductive film between the electronic paper and the position detecting device results in a position detecting device to which a display function is added without reducing transmittance and increasing thickness.

DETAILED DESCRIPTION OF THE PREFERRED EMBODIMENT(S)

An embodiment of the present invention will be described below with reference to FIG. 1A to 12. First, the operating principle of a position detecting section 101 will be briefly described below with reference to FIGS. 1A, 1B, 2A, 2B, 2C and 2D, and the principle of an electronic paper 301, which is a display unit, will be briefly described below with reference to FIGS. 3 and 4.

Figure 1A:
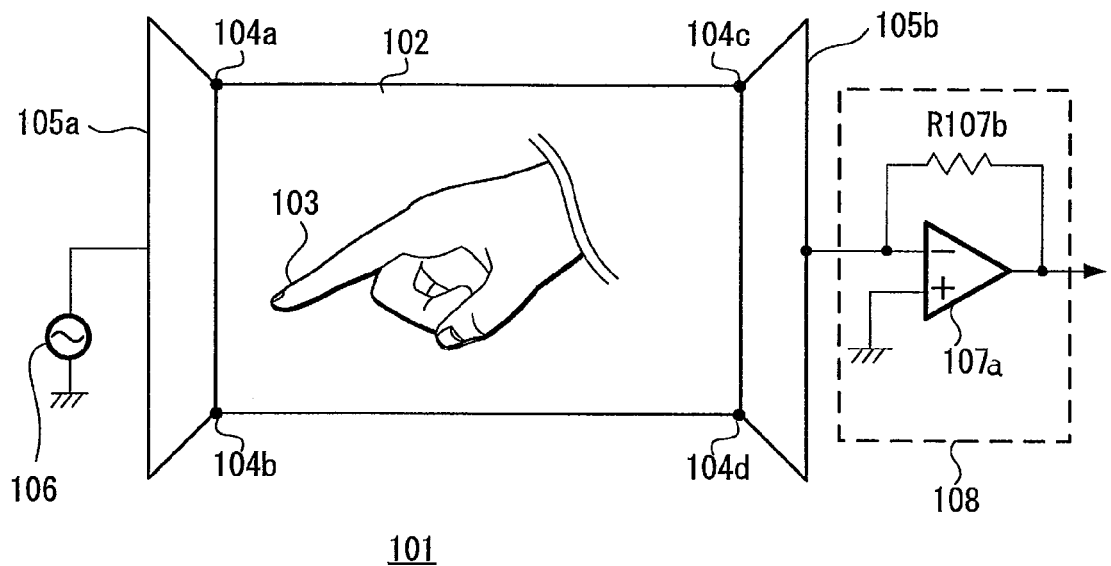
FIGS. 1A and 1B are schematic illustrations showing the operating principle of a position detecting device according to an embodiment of the present invention.

As shown in FIG. 1A, the position detecting section 101 includes an electrode film 102 which is a transparent conductive film, contacts 104a to 104d, wires 105a and 105b, an AC voltage source 106, a current-voltage conversion circuit 108 and the like.

The electrode film 102 may be a transparent conductive film such as an ITO (indium tin oxide) film, an ATO film obtained by adding antimony into tin oxide, or an AZO film obtained by adding aluminum into zinc oxide. A thin insulation film (not shown) is attached to the surface of the electrode film 102. A user touches the electrode film 102 through the insulation film with finger 103. Further, four contacts 104a, 104b, 104c, 104d are respectively provided at four corners of the electrode film 102. The contacts 104a and 104b are connected with each other by the wire 105a, and the contacts 104c and 104d are connected with each other by the wire 105b.

The wire 105a is connected to the AC voltage source 106. The wire 105b is connected to the current-voltage conversion circuit 108 consisting of an operational amplifier 107a and a resistor R107b.

Figure 1B:
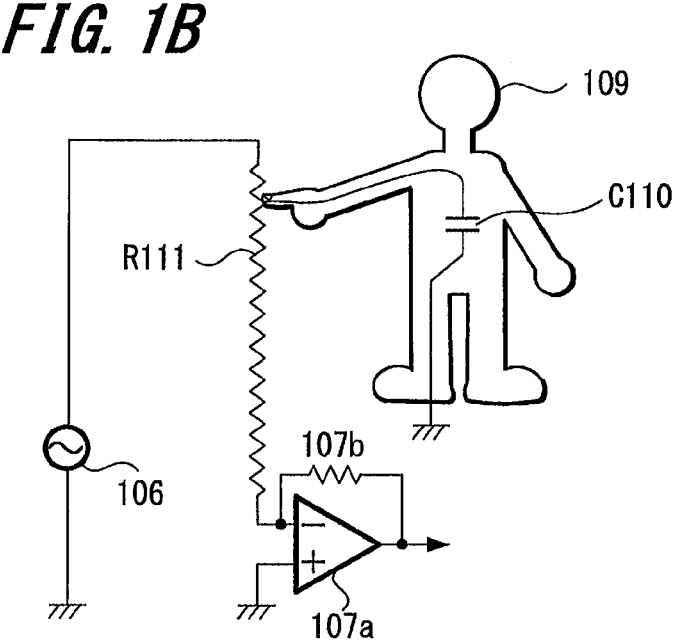

Referring now to FIG. 1B, a human body 109 can be deemed as an equivalent capacitor having capacitance of several pF, and such an equivalent capacitor is represented by a human body's capacitor C110. The input terminal of the current-voltage conversion circuit 108 consisting of the operational amplifier 107a and the resistor R107b can be equivalently deemed as in a conductive state due to a well-known imaginary short phenomenon. Thus, an AC current generated by the AC voltage source 106 is branched into two currents: current flowing through an electrode film resistor R111 formed by the electrode film 102, and current flowing through the human body's capacitor C110 that touches a point of the electrode film 102.

Two cases will be described below with reference to FIGS. 2A to 2D, a first case where the AC voltage source 106 is connected to the wire 105a of the position detecting section 101, and a second case where the AC voltage source 106 is connected to the wire 105b of the position detecting section 101.

Figure 2A:
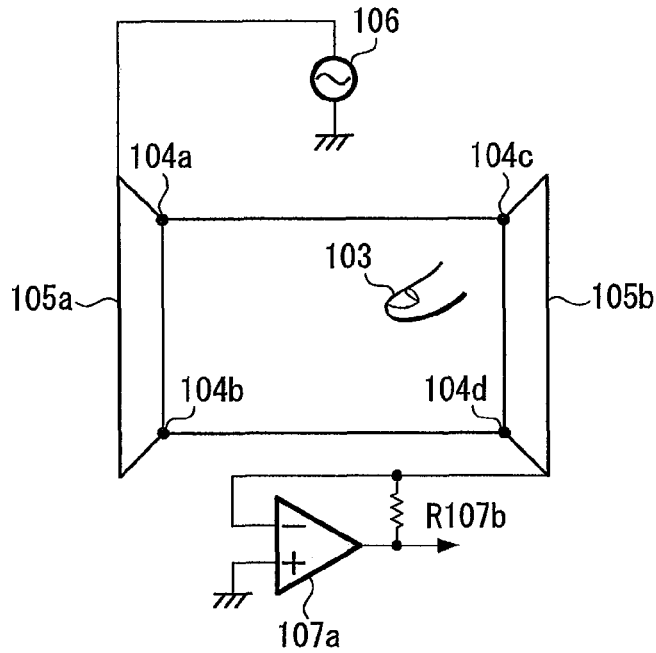
FIGS. 2A to 2D are schematic illustrations showing the operating principle of the position detecting device according to the aforesaid embodiment.
Figure 2B:
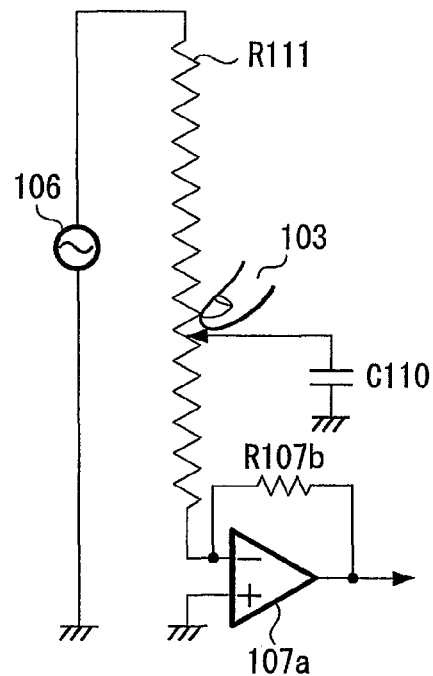
Figure 2C:
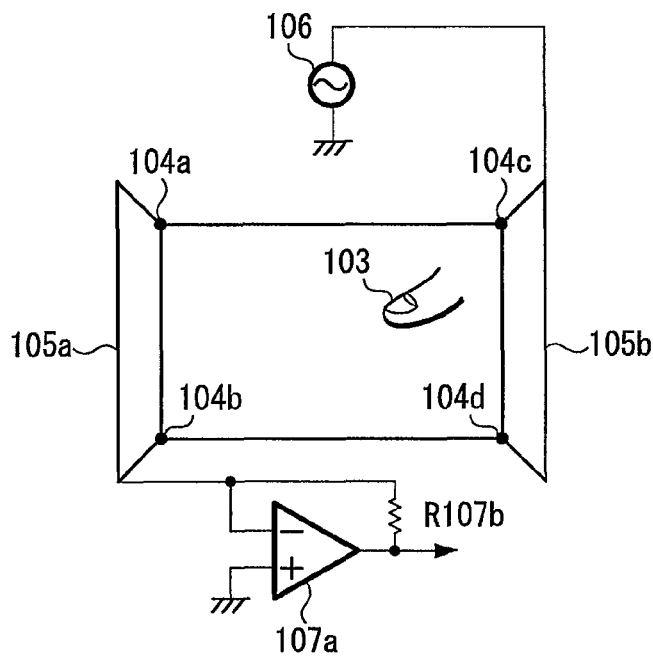
Figure 2D:
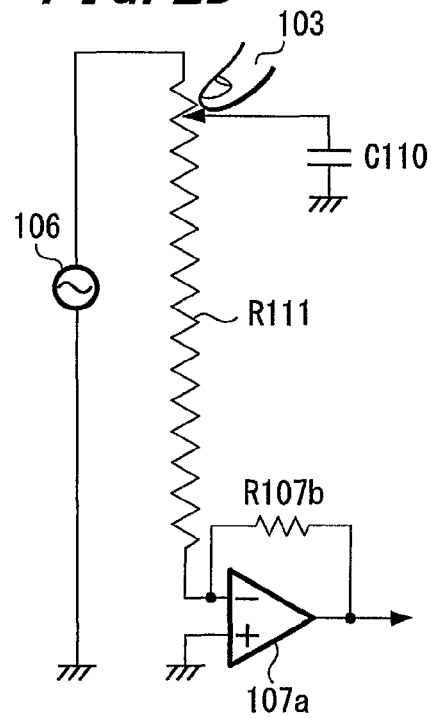

As can be known by comparing the equivalent circuit shown in FIG. 2B with the equivalent circuit shown in FIG. 2D when viewed from the AC voltage source 106, the position where the user touches the electrode film 102 with finger 103 is different between the equivalent circuits. Thus, since the synthetic impedance formed by the electrode film resistor R111 of the electrode film 102 and the human body's capacitor C110 is different between the equivalent circuit shown in FIG. 2B and the equivalent circuit shown in FIG. 2D, the current detected by the current-voltage conversion circuit 108 will be different between the equivalent circuit shown in FIG. 2B and the equivalent circuit shown in FIG. 2D. It is possible to detect the position of the finger 103 in a left-right direction of the electrode film 102 by calculating the current difference.

While the position of the finger 103 in the left-right direction of the electrode film 102 can be detected by the arrangements shown in FIGS. 2A and 2C, the position of the finger 103 in an up-down direction of the electrode film 102 can also be detected in a similar manner. Specifically, in order to detect the position of the finger 103 in the up-down direction, similar processing can be performed in an arrangement in which the contacts 104a and 104c of the electrode film 102 (i.e., the two contacts on the upper side) are connected to each other, and the contacts 104b and 104d of the electrode film 102 (i.e., the two contacts on the lower side) are connected to each other.

As described above, in the electrostatic capacity type position detecting device using a transparent electrode film, the AC voltage is applied to the "up", "down", "left" and "right" sides of the transparent electrode film to detect the respective currents, and the position of the finger at the transparent electrode film is detected by calculating the current differences.

Incidentally, in order to effectively detect the effect caused by touching the electrode film 102 with the finger 103 of the user, several techniques are used in the position detecting device. For example, the frequency of the AC voltage source 106 is set to 200 kHz, which is the frequency most easily absorbed by the human body.

Figure 3:
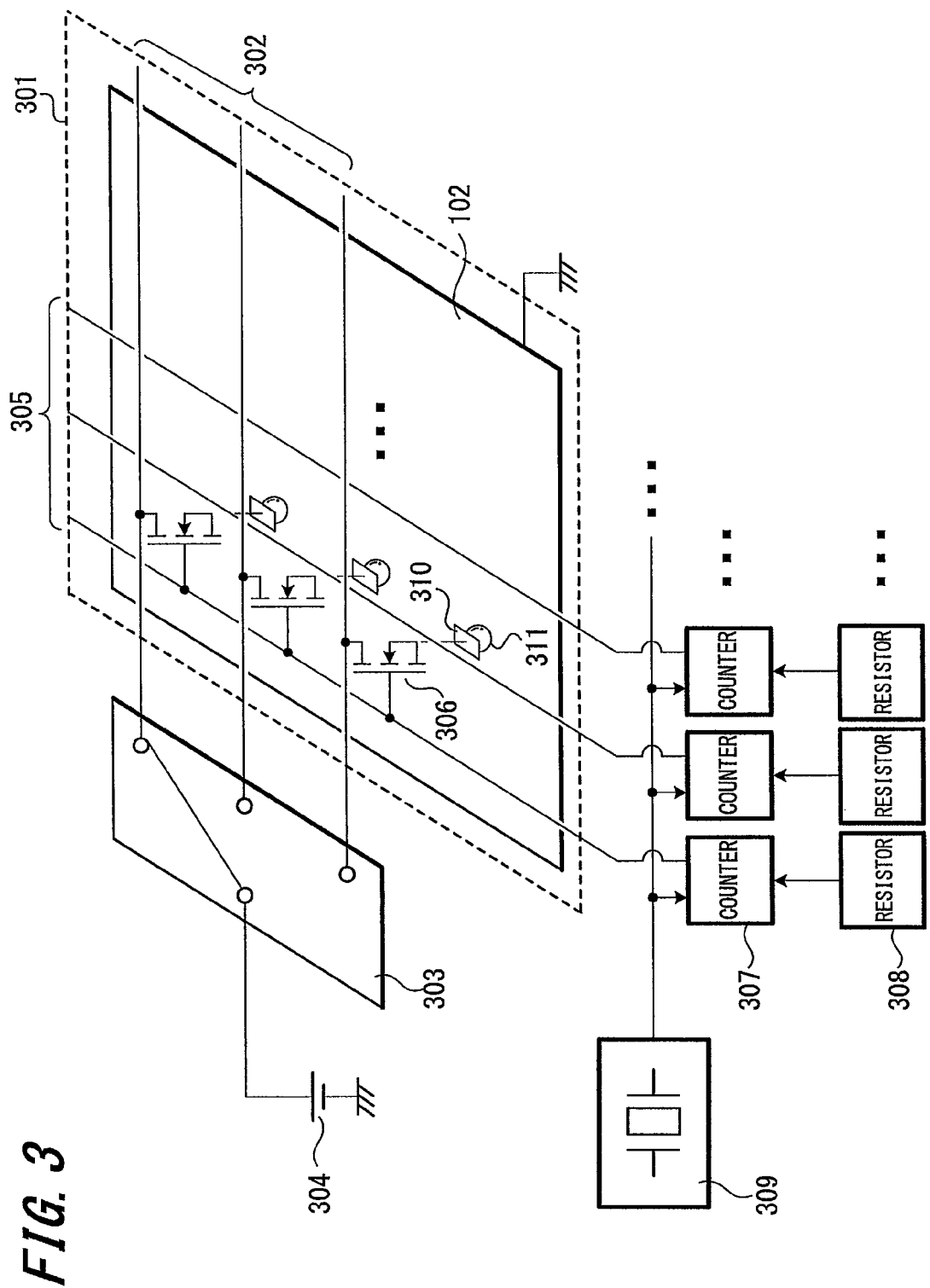
FIG. 3 is a schematic illustration showing the principle of an electronic paper according to the aforesaid embodiment.

Next, the operating principle of the electronic paper 301 will be described below with reference to FIGS. 3 and 4. As shown in FIG. 3, the electronic paper 301 includes a plurality of horizontal voltage lines 302 and vertical control lines 305 arranged into a matrix, and a horizontal selection switch 303. The horizontal voltage lines 302 are selectively connected to a DC voltage source 304 through the horizontal selection switch 303. Each of intersections of the horizontal voltage lines 302 and the vertical control lines 305 has a FET 306 connected thereto. The drain terminal of the FET 306 is connected to the horizontal voltage line 302, and the gate terminal of the FET 306 is connected to the vertical control line 305.

Each of the vertical control lines 305 is connected to a counter 307. Each counter 307 is connected to a register 308. When a counting value set in the register 308 is output to the counter 307, the 307 starts to count the clock input from a clock generator 309. When the counting value of the clock reaches the counting value set by the register 308, the output drops from a high level (H) to a low level (L). In other words, the counting value set for the counter 307 through the register 308 represents the on-time of the FET 306.

Figure 4:
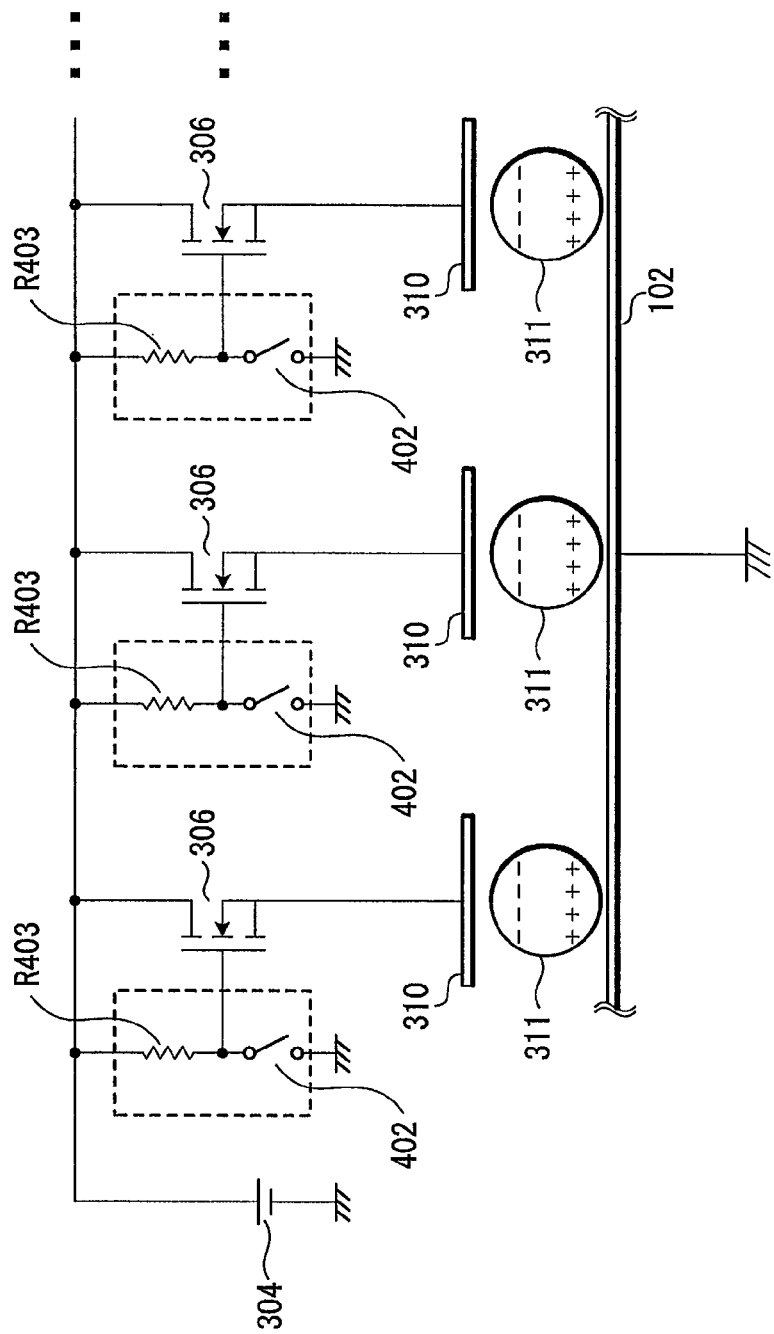
FIG. 4 is an equivalent circuit of the aforesaid schematic illustration of the electronic paper.

Thus, the counter 307 in FIG. 3 is an equivalent of the combination of a switch 402 and a resistor R403 surrounded by the dotted line in FIG. 4. The on-time of the switch equals the time while the counter 307 outputs "H".

A small electrode plate 310 is connected to the source terminal of the FET 306. The grounded electrode film 102 is arranged so as to face the electrode plate 310. A small bead 311 is sandwiched between the electrode plate 310 and the electrode film 102, the bead 311 having electrically-charged particulates enclosed therein.

The bead 311 has white particulates and black particulates enclosed therein. The black particulates enclosed in the bead 311 are negatively-charged, and the white particulates enclosed in the bead 311 are positively-charged. Further, the bead 311 is configured in such a manner in which the black particulates are enclosed in one hemisphere of the bead 311, and the white particulates are enclosed in the other hemisphere.

When a voltage is applied to the bead 311, the bead 311 will rotate due to the electrical charges of the particulates enclosed in the bead 311. The rotation of the bead 311 differs according to the time during which the voltage is applied. In other words, the density (darkness) between white and black for each dot can be controlled by changing the time during which the voltage is applied to the bead 311.

Incidentally, since the electronic paper 301 is defined by white and black colors of each dot, not only the positive electrode but also the negative electrode are applied to rotate the beads 311, so that each dot changes from white to black and from black to white.

As described above, in the electronic paper 301, the bead 311 rotates after the voltage is applied to the bead 311, and rotation state of the bead 311 remains unchanged even if the application of the voltage is discontinued, and therefore display content of the electronic paper 301 is kept. Thus, once the electronic paper 301 has been driven, the display state can remain unchanged even if the application of the voltage stops, and therefore the electronic paper 301 provides savings in power consumption compared with the general liquid crystal display (LCD).

A common feature of the position detecting section 101 and the electronic paper 301 is that they each have an electrode film 102. In the present invention, the electrode film 102 is mutually-exclusively shared by both the position detecting section 101 and the electronic paper 301 in time-division manner.

Figure 5:
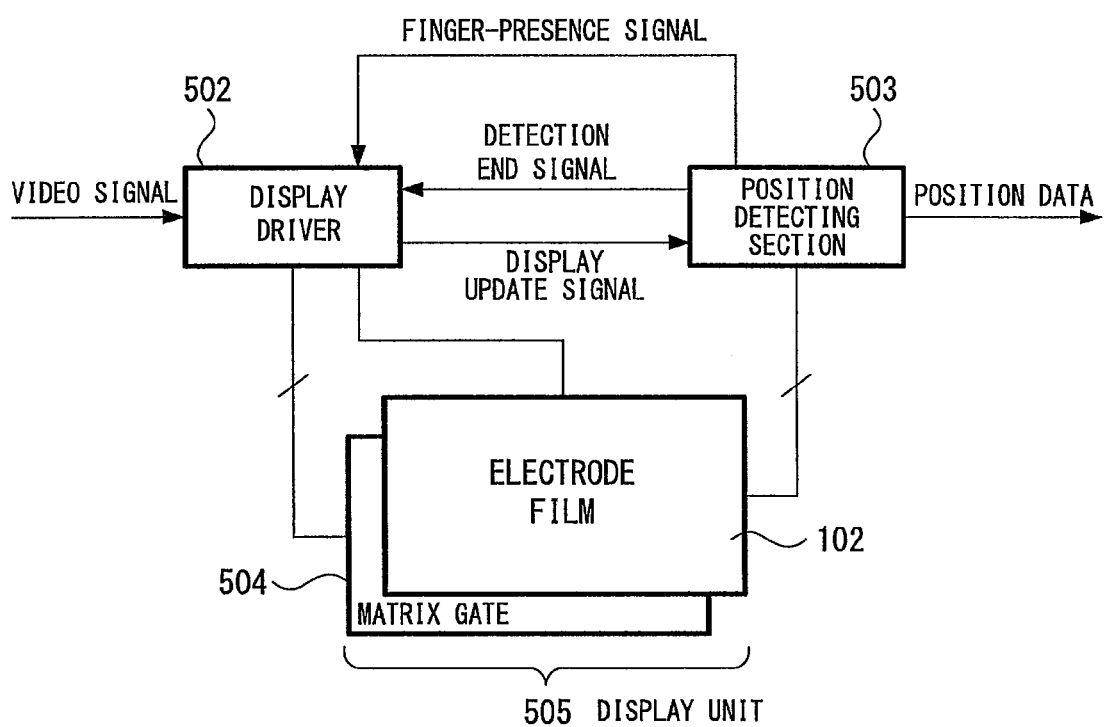
FIG. 5 is a block diagram schematically showing a position detecting device according to a first embodiment of the present invention.

Next, a position detecting device 501 according to a first embodiment of the present invention will be described below with reference to FIG. 5. The position detecting device 501 includes a display driver 502, a position detecting section 503, a matrix gate 504 and a display unit 505.

The display driver 502 drives the display unit 505. The display unit 505 includes the electrode film 102 and a matrix gate 504, the electrode film 102 being formed of a transparent conductive film such as an ITO film. The display unit 505 is driven by the display driver 502 to display an image, text and/or the like based on a video signal input from an external device.

The position detecting section 503 is a circuit for detecting the position where an indicator such as a finger touches the electrode film 102 of the display unit 505. Herein, the display driver 502 and the position detecting section 503 mutually-exclusively occupy the electrode film 102. The display driver 502 performs exclusive control.

When performing the display driving based on the video signal, the display driver 502 outputs a control signal to the position detecting section 503. When starting to perform the display driving, the control signal provides a display update signal which indicates that "display driving of the electronic paper will be performed from now". In a similar manner, the position detecting section 503 outputs two kinds of control signals to the display driver 502. The two kinds of control signals are: a detection end signal which indicates that "process for detecting the finger is completed" and a finger-presence signal which indicates that "currently there is a finger (or there is no finger) on the electrode film".

The matrix gate 504 includes the horizontal voltage lines 302, the vertical control lines 305, and the FET 306 and electrode plate 310 provided at each of the intersections of the horizontal voltage lines 302 and the vertical control lines 305 (see FIG. 3). Though not shown in FIG. 5, the beads 311 are sandwiched between the matrix gate 504 and the electrode film 102. The display unit 505 is composed of the matrix gate 504, the electrode film 102 and the beads 311 (not shown).

When a video signal is input from a host device such as a personal computer, for example, the display driver 502 voltage-drives the beads 311 interposed between the matrix gate 504 and the electrode film 102 through the matrix gate 504. When starting the display driving based on the video signal, the display driver 502 outputs the display update signal to the position detecting section 503.

The position detecting section 503 applies the AC voltage to the "up", "down", "left" and "right" sides of the electrode film 102 to detect whether there is a finger by detecting the current, and, if there is a finger, detects the position of the finger. After the process for detecting the finger is completed, the position detecting section 503 outputs the detection end signal to the display driver 502. Further, the position detecting section 503 outputs the finger-presence signal which indicates whether there is the finger 103 on the electrode film 102 or not.

Figure 6:
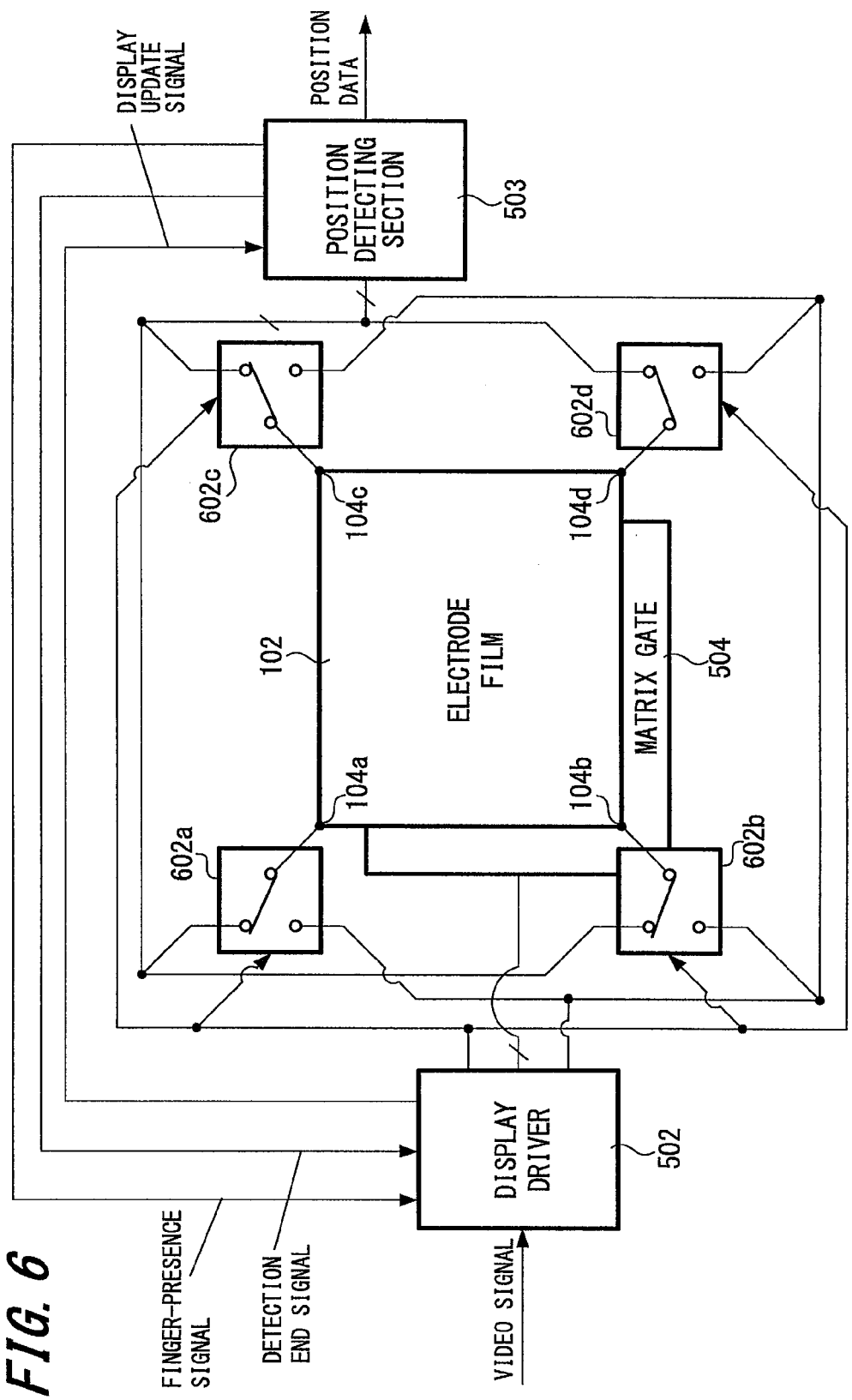
FIG. 6 is a block diagram showing the details of the structure around an electrode film of the position detecting device according to the first embodiment.

Next, the connecting relation between the display driver 502, the position detecting section 503 and the display unit 505 shown in FIG. 5 will be described in detail with reference to FIG. 6. Four mode selector switches 602a, 602b, 602c, 602d are respectively provided at the four corners of the electrode film 102. One terminal of each of the mode selector switches 602a, 602b, 602c, 602d is connected to the display driver 502. These terminals are provided for supplying a common potential to the electrode film 102. Thus, these terminals are connected with each other.

The other terminal of each of the mode selector switches 602a, 602b, 602c, 602d is connected to the position detecting section 503. These terminals are connected to the position detecting section 503 so as to sequentially apply the AC voltage to the "up," "down," "left," and "right" sides of the electrode film 102 to detect the current, as described above. The switching control of the mode selector switch 602a, 602b, 602c, 602d is performed by the display driver 502.

Next, the details of the display driver 502 and the position detecting section 503 shown in FIG. 5 will be described with reference to FIGS. 7 and 8.

Figure 7:
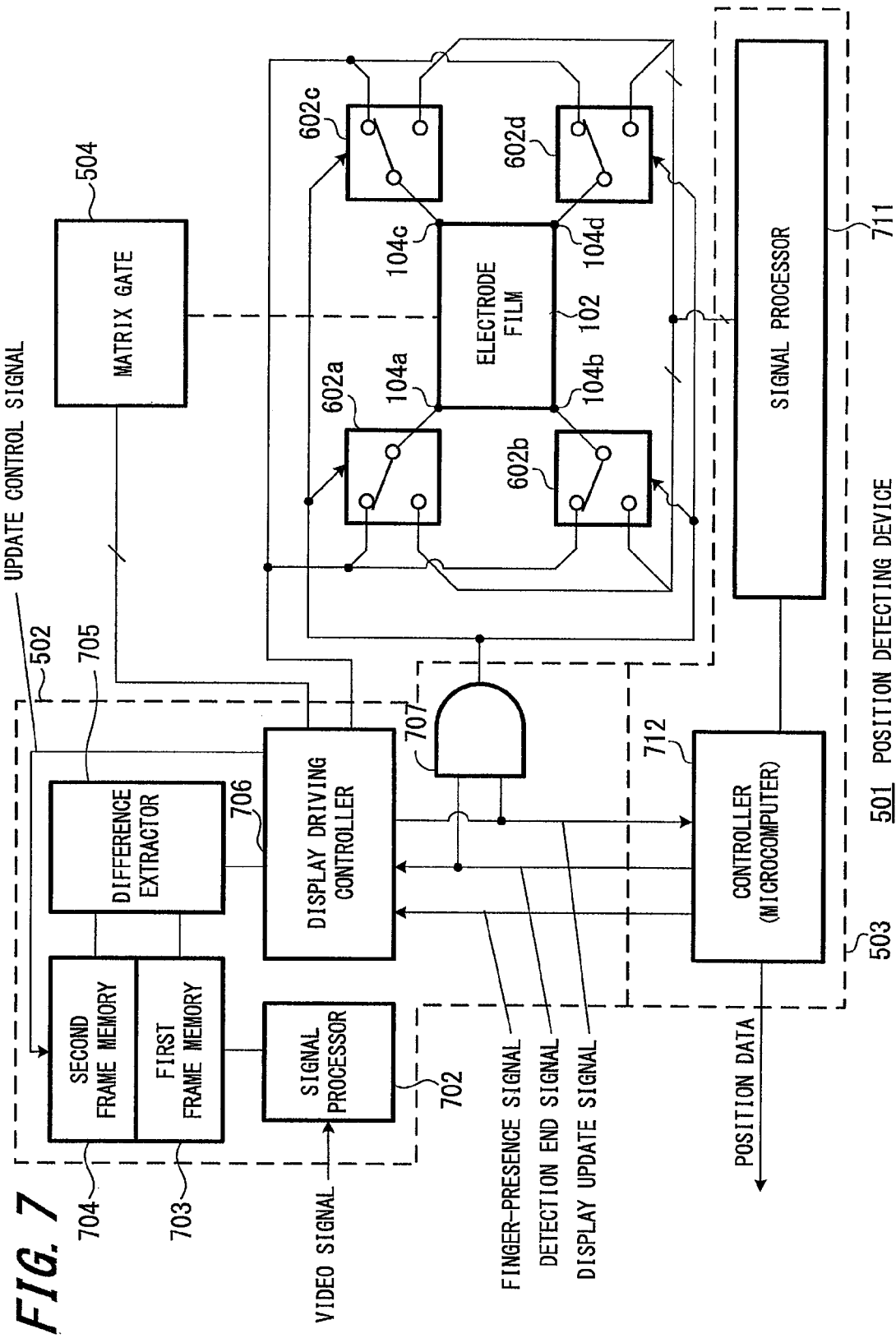
FIG. 7 is a block diagram showing the details of the inner structure of a display driver and a position detecting section of the position detecting device according to the first embodiment.
Figure 8:
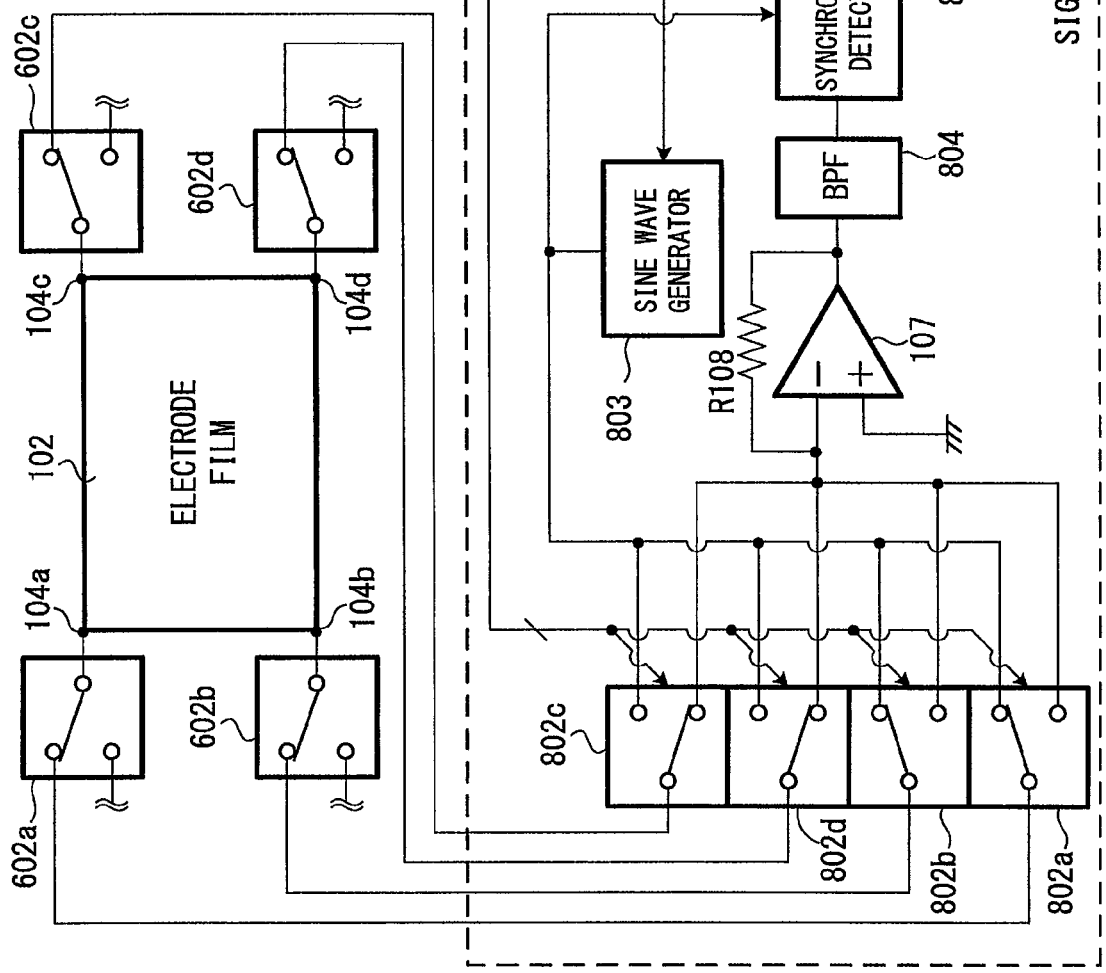
FIG. 8 is a block diagram showing the details of the position detecting section of the position detecting device according to the first embodiment.

As shown in FIG. 7, the video signal output by the host device is input to the display driver 502. The video signal is converted into video data by a signal processor 702 inside the display driver 502. The video data is stored in a first frame memory 703 for each frame.

The display driver 502 is provided with a second frame memory 704 whose capacity is the same as that of the first frame memory 703. The display states of the respective beads 311 of the display unit 505 are stored in the second frame memory 704.

The display driver 502 is also provided with a difference extractor 705 and a display driving controller 706. The difference extractor 705 creates difference data between the first frame memory 703 and the second frame memory 704, and transmits the difference data to the display driving controller 706.

The display driving controller 706, which is configured by a microcomputer, performs the driving control on the matrix gate 504 based on the difference data. Further, after performing the driving control on the matrix gate 504, the display driving controller 706 stores the result of the driving control in the second frame memory 704.

Further, in order to provide a time-division control between the display driver 502 and the position detecting section 503, the display driving controller 706 transmits the display update signal to a controller 712 inside the position detecting section 503 and receives the detection end signal and the finger-presence signal from the controller 712.

Herein, the display driver 502 cannot perform the display driving during the time while the position detecting section 503 is performing the position detecting operation. During the time while the display driving control is not performed, the display driving controller 706 stops updating the second frame memory 704. To stop updating the second frame memory 704, an update control signal is supplied from the display driving controller 706 to the second frame memory 704.

In other words, the display driver 502 stops performing the display driving during the time while the position detecting section 503 is performing the position detecting operation. To this end, in the display driver 502, an update control signal is supplied from the display driving controller 706 to the second frame memory 704, so as to stop updating the second frame memory 704.

The switching control of the mode selector switches 602a, 602b, 602c, 602d connected to the four corners of the electrode film 102 is performed based on an output signal of an AND gate 707, to which the display update signal and the detection end signal are input. When the display update signal and the detection end signal are both in the logical true (H) state, the mode selector switches 602a, 602b, 602c, 602d are connected to the side of the display driver 502.

The mode selector switches 602a, 602b, 602c, 602d connected to the four corners of the electrode film 102 are respectively connected to four input/output selector switches 802a, 802b, 802c, 802d. The input/output selector switches 802a, 802b, 802c, 802d selectively switch between an output of a sine wave generator 803 (which is an AC voltage source) and an inversion input of an operational amplifier 107 (which forms a current-voltage conversion circuit).

By controlling the switching of the four input/output selector switches 802a, 802b, 802c, 802d, the AC voltage can be sequentially applied to the "up", "down", "left" and "right" sides of the electrode film 102 to detect the current.

The signal output from the operational amplifier 107 is input to a band pass filter 804 in order to remove the noise. Incidentally, the center frequency of the band pass filter 804 is set to be substantially equal to the frequency of the signal generated by the sine wave generator 803.

Along with the AC voltage signal generated by the sine wave generator 803, the output signal of the band pass filter 804 is input to a synchronous detector 805 configured by an analog multiplier.

The output signal of the synchronous detector 805 is input to an integrator 806 where an integration process is performed. Incidentally, since the integration process has to be reset after an A/D conversion process has been completed by an A/D converter 807 connected to the post-stage of the integrator 806, a reset signal is input to the integrator 806 from the controller 712.

The A/D converter 807 converts the output signal of the integrator 806 into digital data, and outputs the digital data to the controller 712 which is configured by a microcomputer. The controller 712 controls the switching of the input/output selector switches 802a, 802b, 802c, 802d, controls the output timing of the sine wave of the sine wave generator 803, creates the reset signal to be output to the integrator 806, and creates a conversion trigger signal for the A/D converter 807. Further, based on the digital data obtained from the A/D converter 807, the controller 712 detects whether there is a finger, calculates the position data of the finger, and outputs the calculated position data.

Preferably, the position indicated by the indicator could be constantly detected by the position detecting section 503. Since the position detecting section 503 does not know when the position indicating performed by the indicator such as the finger is started, traceability will be poor if the duration while the detecting is stopped becomes long.

Normally, a requirement for a pointing device, such as a mouse, is that a position of a position indicator (a pointer) can be obtained at a time interval of approximately 10 msec. The position detecting section 503 performs the detection operation to detect the indicator by sequentially applying the AC voltage to the "up," "down," "left," and "right" sides of the electrode film 102 to detect the current. Thus, if the detection operation is performed only by the position detecting section 503, then the AC voltage needs to be sequentially applied to the "up," "down," "left," and "right" sides of the electrode film 102 at a time interval of 2.5 msec.

However, in the present embodiment, the display driver 502 and the position detecting section 503 mutually-exclusively share the single electrode film 102. In other words, the position detecting section 503 cannot perform a position detection while the display driver 502 is performing display control.

To solve this problem, if there is no change in display content, the detection operation is preferentially performed by the position detecting section 503, while if there is a change in display content, the operation of the display driver 502 is inserted into the detection operation of the position detecting section 503.

Figure 9:
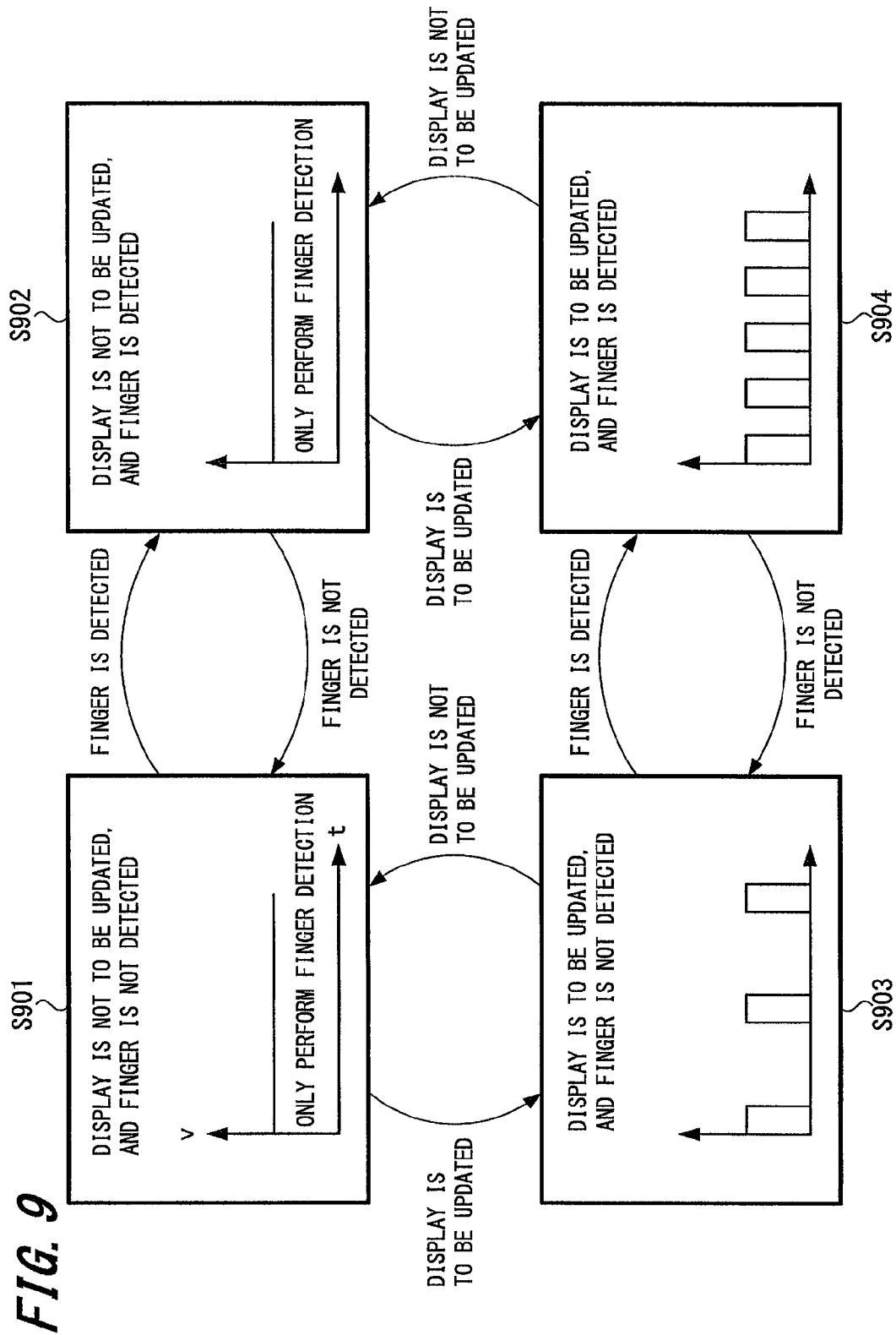
FIG. 9 is a state transition diagram showing transition of the operating state of the display driver and the position detecting section of the position detecting device according to the first embodiment.

FIG. 9 is a state transition diagram showing transition of the operating state of the display driver 502 and the position detecting section 503. In states S901 to S904, each of the graphs shows a conversion signal of the output of the AND gate 707. The graphs are provided to explain that the detecting operation for detecting the finger is performed when the logic is true.

In the state where no video signal is input to the display driver 502 from the host device and no indicator is detected, since it is not necessary for the display driver 502 to perform display driving, the position detecting section 503 constantly performs position detecting operation (S901).

Further, when it is detected by the position detecting section 503 that there is a finger, if no video signal is input from the host device, then the position detecting section 503 continues to constantly perform position detecting operation like in state S901 (S902).

In state S901, if there is a video signal input to the display driver 502 from the host device, then most of the driving time is assigned to the display driver 502, and minimal time is left for the position detecting section 503 to barely detect the finger (S903).

In state S902, if there is a video signal input to the display driver 502 from the host device, since the operation for the position detecting section 503 to detect the indicator needs to be more preferentially performed than the operation of the display driver 502 so that the position detecting section 503 can detect indicated position while the display driver 502 is performing display control, the driving time assigned to the position detecting section 503 is longer than the driving time assigned to the display driver 502 (S904).

Similarly, in state S903, when the position indicated by the indicator is detected by the position detecting section 503, the state will be shifted to state S904 so that the movement of the indicator can be reliably traced.

As described above, in a particular state (S904), since it is necessary to alternately operate the display driver 502 and the position detecting section 503, the operating time of the position detecting section 503 needs to be limited. Incidentally, one cycle of the position detecting operation of the position detecting section 503 has to be shorter than 10 msec. Furthermore, it is preferred that one-half of the time is assigned to the position detecting section 503 and one-half of the time is assigned to the time assigned to the display driver 502. This is because the display process of the display driver 502 (which is the electronic paper) can hardly be performed rapidly. As a concrete example, it is preferable that, in one operation cycle, the time assigned to the display driver is 5 to 6 msec, and the time assigned to the position detection section is 4 to 5 msec. In such a specification, it is preferable that, in a four-step cycle of sequentially applying the AC voltage to the "up," "down," "left," and "right" sides of the electrode film 102 to detect the current, each step is completed in 1 msec.

Next, various control signals output by the display driver 502 and the position detecting section 503 will be described below with reference to FIG. 10. Diagrams (a), (b), (c), (d), (e), (f) and (g) of FIG. 10 are timing diagrams showing various signals and states of the display driver 502 and the position detecting section 503.

Figure 10:
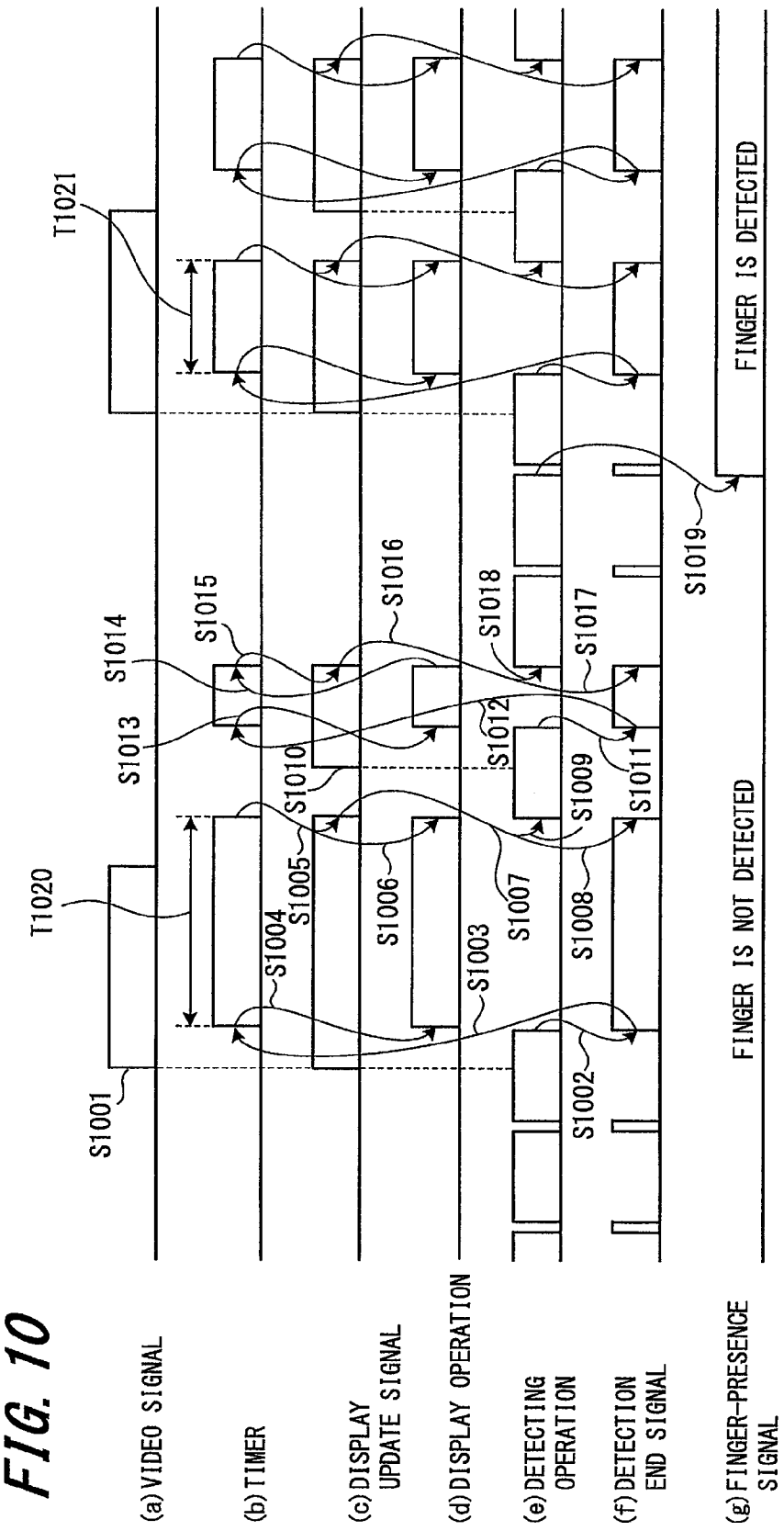
FIG. 10 is a timing diagram showing various signals and states of the display driver and the position detecting section of the position detecting device according to the first embodiment.

Herein, diagram (a) of FIG. 10 shows the video signal. The duration while the video signal is input from the host device is schematically expressed by the logical true.

Diagram (b) of FIG. 10 shows logical value output by a timer. The timer is achieved by a program inside the display driving controller 706.

Diagram (c) of FIG. 10 shows the display update signal. The display update signal is transmitted from the display driver 502 to the position detecting section 503 to indicate to the position detecting section 503 that the display driving operation shall be performed.

Diagram (d) of FIG. 10 shows the state of the display operation performed by the display driver 502. The imaginary signal waveform shows that the display driver 502 performs the display operation when the logic is true.

Diagram (e) of FIG. 10 shows the state of the detecting operation performed by the position detecting section 503. The imaginary signal waveform shows that the position detecting section 503 performs the position detecting operation when the logic is true.

Diagram (f) of FIG. 10 shows the detection end signal. The detection end signal is transmitted from the position detecting section 503 to the display driver 502 to indicate to the display driver 502 that the position detecting operation for detecting the position of the finger is completed. From the time when the display update signal is set to true, the display driver 502 performs display operation upon receiving the display update signal at a logical true state.

Diagram (g) of FIG. 10 shows the finger-presence signal. The finger-presence signal is a signal which indicates that the position detecting section 503 has detected the finger.

After detecting, through the difference extractor 705, that the video signal is input from the host device and therefore the display content displayed by the beads 311 needs to be updated, the display driving controller 706 shifts the display update signal from logical "false" to logical "true" so that a "display drive request" is notified to the controller 712. However, in most cases, the position detecting section 503 is performing the detecting operation for detecting the finger at this time (S1001). To solve this problem, after the display update signal has become true, the controller 712 shifts the detection end signal from "false" to "true" as soon as the detecting operation terminates, and temporarily stops the detecting operation for detecting the finger (S1002).

Upon detecting that the detection end signal has become "true," the display driving controller 706 turns on the internal timer (S1003). The timer specifies the time for the display driver 502 to perform the display driving operation. In other words, the display driver 502 performs the display driving operation only while the timer is in the "true" state (S1004). This means that the display update operation will be interrupted because time is up, even if the display driving controller 706 fails to complete the display update operation within the time specified by the timer.

When the timer has clocked a predetermined time, the display driving controller 706 shifts the display update signal from "true" to "false" (S1005) and stops the display operation (S1006).

Upon detecting that the display update signal has been shifted from "true" to "false" (S1007), the controller 712 shifts the detection end signal from "true" to "false" (S1008) and restarts the detecting operation for detecting the finger (S1009).

After detecting, through the difference extractor 705, that the display content displayed by the beads 311 needs to be updated because the last display update operation was interrupted due to time up even if no video signal is input from the host device, the display driving controller 706 shifts the display update signal from logical "false" to logical "true" again so that a "display drive request" is notified to the controller 712. However, in most cases, the position detecting section 503 is performing the detecting operation for detecting the finger at this time (S1010). To solve this problem, after the display update signal has become true, the controller 712 shifts the detection end signal from "false" to "true" as soon as the detecting operation terminates, and temporarily stops the detecting operation for detecting the finger (S1011).

Upon detecting that the detection end signal has become "true," the display driving controller 706 turns on the internal timer (S1012). The display driver 502 performs the display driving operation only while the timer is in the "true" state.

At the point when the display driving operation is completed, the content of the first frame memory 703 and the content of the second frame memory 704 are completely the same. In other words, the display update operation needs not to be performed. Upon detecting that the content of the first frame memory 703 and the content of the second frame memory 704 are completely the same and therefore the display update operation needs not to be performed, the display driver stops performing the display operation and resets the timer (S1014).

After the timer is reset, the output of the timer is shifted from logical "true" to logical "false." As a result, the logic of the display update signal is shifted from "true" to "false" (S1015).

Upon detecting that the display update signal has been shifted from "true" to "false" (S1016), the controller 712 shifts the detection end signal from "true" to "false" (S1017) and restarts the detecting operation for detecting the finger (S1018).

The display driving controller 706 switches the clocking time of the timer according to the logical state of the finger-presence signal (diagram (g) of FIG. 10). Thus, the clocking time (T1021) of the timer of the display driving controller 706 after the finger is detected (S1019) is shorter than the clocking time (T1020) before the finger is detected.

As described above, the position detecting device 501 according to the first embodiment of the present invention discloses a technical idea in which the electrode film 102 is mutually-exclusively shared by the display driver 502 and the position detecting section 503 in a time-division manner. The electrode film 102 may also be shared by the display driver 502 and the position detecting section 503 on different frequency ranges, instead of in a time-division manner.

Figure 11:
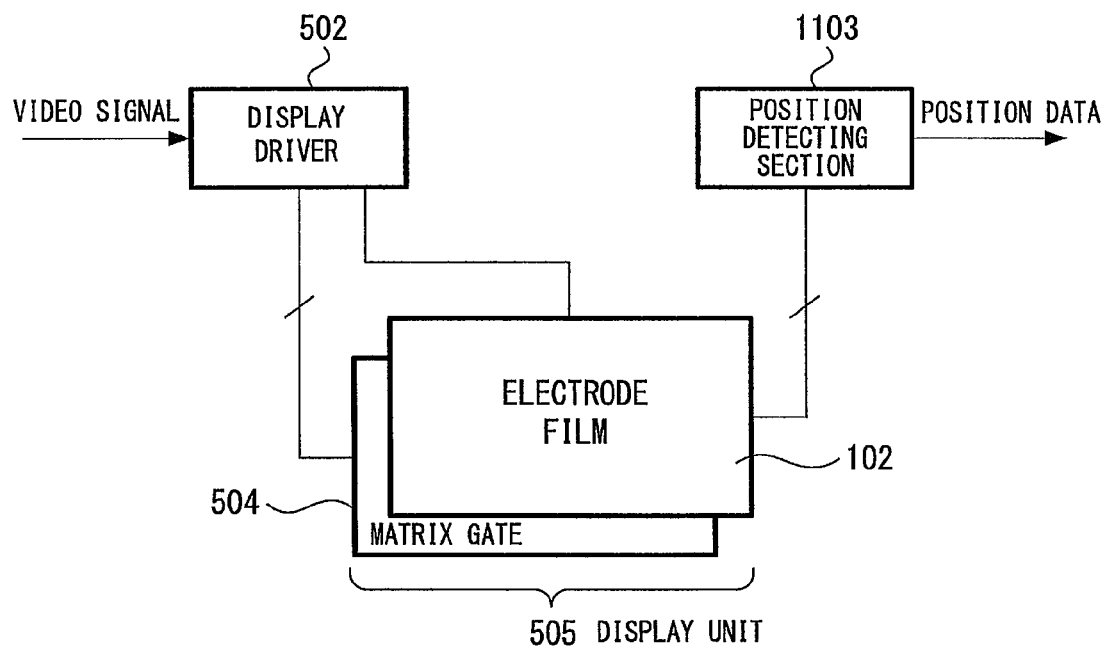
FIG. 11 is a block diagram schematically showing a position detecting device according to a second embodiment of the present invention.
Figure 12:
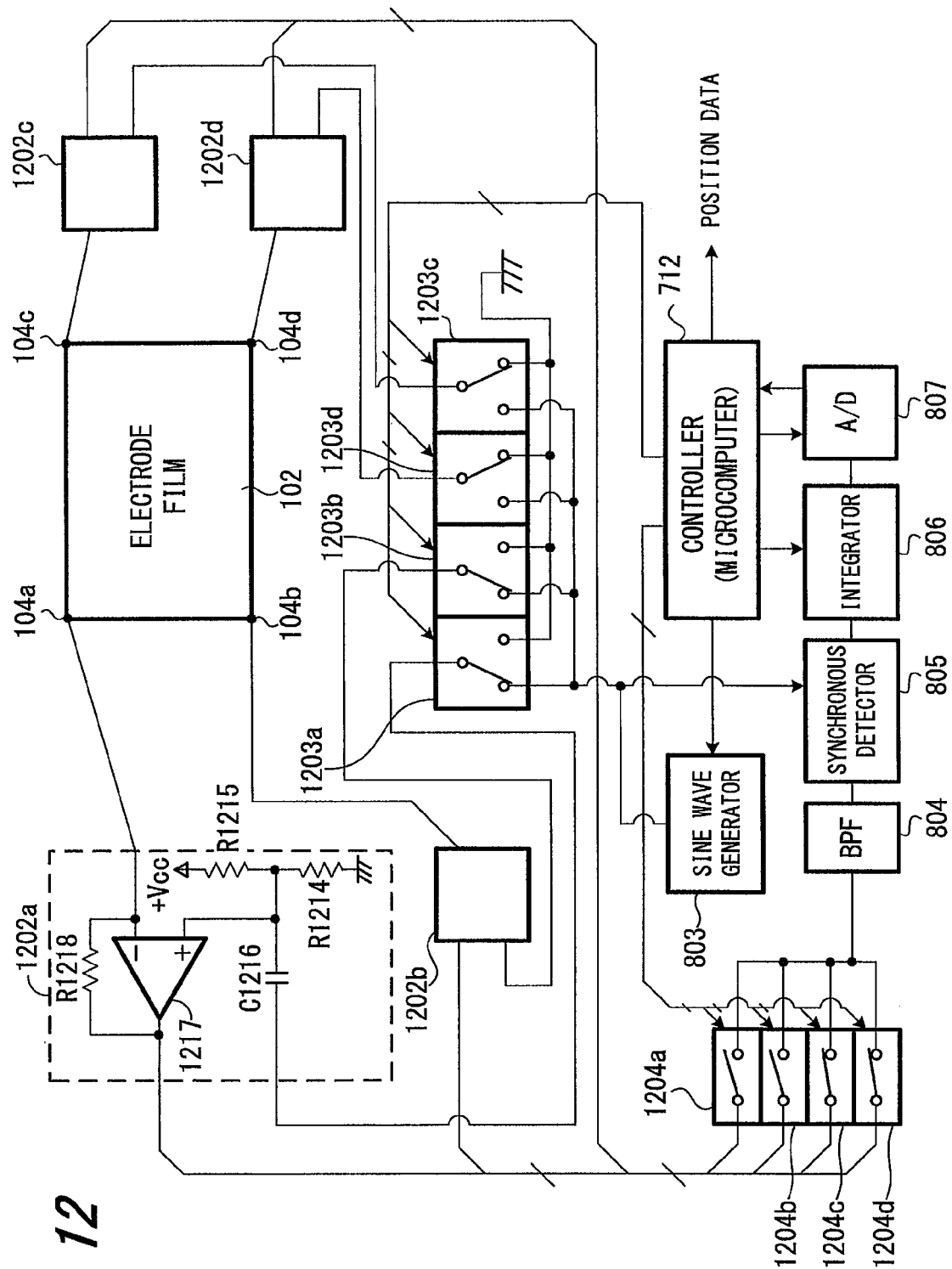
FIG. 12 is a block diagram showing the details of the position detecting device according to the second embodiment.

Based on this technical idea, a second embodiment of the present invention will be described below with reference to FIGS. 11 and 12. FIG. 11 is a block diagram schematically showing a position detecting device 1011 according to the second embodiment of the present invention.

The position detecting device 1011 differs from the position detecting device 501 of the first embodiment of the present invention in that the display update signal, the detection end signal and the finger-presence signal are not exchanged between the display driver 502 and a position detecting section 1103. Since other structures of the position detecting device 1011 of the second embodiment are identical to those of the position detecting device 501 of the first embodiment, the details thereof will not be described.

The position detecting section 1103 of the second embodiment of the present invention will be described below with reference to FIG. 12. In the second embodiment, current detection circuits 1202a, 1202b, 1202c, 1202d are respectively provided at the four corners of the electrode film 102, instead of the mode selector switches 602a, 602b, 602c, 602d of the first embodiment.

The current detection circuits 1202a, 1202b, 1202c, 1202d are respectively connected to sine wave-control switches 1203a, 1203b, 1203c, 1203d and current detection switches 1204a, 1204b, 1204c, 1204d. The current detection circuits 1202a, 1202b, 1202c, 1202d each include a current-voltage conversion circuit, resistors R1214 and R1215, and a capacitor C1216, wherein the current-voltage conversion circuit is configured by an operational amplifier 1217 and a resistor R1218, the resistors R1214 and R1215 provide offset voltage to an input terminal on the positive electrode side of the operational amplifier 1217, and the capacitor C1216 applies a sine wave voltage signal to the input terminal on the positive electrode side of the operational amplifier 1217.

The resistors R1214 and R1215 are provided for the display driver 502 to operate the electrode film 102, which is part of the display unit 505. In other words, the resistors R1214 and R1215 apply a predetermined reference voltage to the electrode film 102 using imaginary short phenomenon of the operational amplifier 1217.

The sine wave voltage generated by the sine wave generator 803 is applied to the input terminal on the positive electrode side of the operational amplifier 1217 through the sine wave-control switch 1203a and the capacitor C1216. In other words, the AC voltage is applied to the electrode film 102 using the imaginary short phenomenon of the operational amplifier 1217.

While the sine wave-control switch 1203a is connected to the sine wave generator 803, the current detection switch 1204a is turned off, and while the sine wave-control switch 1203a is not connected to the sine wave generator 803, the current detection switch 1204a is turned on.

Further, the output signal output from the current detection circuits 1202a, 1202b, 1202c, 1202d through the current detection switches 1204a, 1204b, 1204c, 1204d is input to the band pass filter 804. Since the signal process after the band pass filter 804 is identical to that of the first embodiment, the details thereof will not be described.

It is to be understood that the present invention is not limited to the embodiments described above, and various modifications and applications can be made without departing from the spirit and scope of the present invention.

For example, although the first embodiment and the second embodiment of the present invention are described using an example in which the indicator is a finger, the present invention is not limited thereto. For example, when an electrode film having a plurality of electrodes arranged into a matrix is used as the electrode film 102 of the electronic paper 301, an electronic paper may be used in combination with an existing electromagnetic induction type position detecting device or an existing electrostatic coupling type position detecting device. In these cases, dedicated indicators for the respective position detecting devices, specifically a position indicator (a stylus pen) including a resonant circuit which resonates at a predetermined frequency and an electrostatic coupling type input stylus pen can be used.

What is claimed is:

1. A position detecting device comprising:
  a display unit which has a first electrode, one or more second electrodes, and display material interposed between the first electrode and the one or more second electrodes, the display unit being configured such that the display material maintains a display state after a drive power applied between the first electrode and the one or more second electrodes is discontinued;
  a display driver configured to drive the display unit in response to an input signal;
  a position detecting section configured to detect a position indicated on the first electrode by an indicator, wherein the first electrode is commonly used by the position detecting section to detect an indicated position and by the display unit to generate a display; and
  a control section configured to control drive time of the display driver and the position detecting section time-divisionally based on a determined presence of the input signal to the display driver and based on a determined presence of the indicator on or adjacent to the first electrode such that at a first state, in which the input signal is not present and the display driver is not driven while the indicator is present and the position detecting section is continuously driven to detect an indicated position of the indicator, in case a display update signal is received, the control section transitions from the first state to a second state, in which the display driver is time-divisionally driven in between the drive time of the position detecting section,
  wherein the control section is further configured such that at a third state, in which the input signal is present and the display driver is time-divisionally driven in between the drive time of the position detecting section while the indicator is not present, in case the indicator is determined to be present, the control section transitions from the third state to the second state,
  wherein, in the second state, more drive time is assigned to drive the position detecting section than the drive time assigned to drive the position detecting section in the third state.

2. The position detecting device according to claim 1, wherein the position detecting section is an electrostatic capacitive coupling type position detecting section.

3. The position detecting device according to claim 1, wherein the first electrode is an electrode film including a plurality of electrodes arranged in a matrix.

4. The position detecting device according to claim 2, wherein the indicator is at least one of a human finger and an electrostatic coupling type position indicator, and the position detecting device is configured to detect a position where the indicator and the first electrode are electrostatically coupled with each other.

5. The position detecting device according to claim 1, wherein the position detecting section is a resistance film type position detecting section.

6. The position detecting device according to claim 1, wherein the first electrode includes a plurality of sensors arranged in a matrix, and the position detecting section is an electromagnetic induction type position detecting section.

7. The position detecting device according to claim 6, wherein the indicator is an electromagnetic induction type position indicator having a resonant circuit configured by a coil and a capacitor.

8. The position detecting device according to claim 1, wherein the control section is configured to preferentially drive the position detecting section to detect an indicated position than driving the display driver.

9. The position detecting device according to claim 1, wherein the control section controls drive time of the display driver and the position detecting section time-divisionally based on a display update signal received from the display driver.

10. The position detecting device according to claim 1, wherein the control section controls drive time of the display driver and the position detecting section time-divisionally based on a signal received from the position detecting section indicating that detection of an indicated position is completed.

11. The position detecting device according to claim 1, wherein the control section controls drive time of the display driver and the position detecting section time-divisionally based on a signal received from the position detecting section indicating the determined presence of the indicator on or adjacent to the first electrode.

\* \* \* \* \*